(12) United States Patent
Saitoh et al.

(10) Patent No.: US 12,103,229 B2
(45) Date of Patent: Oct. 1, 2024

(54) JETTABLE TEMPORARY BINDERS TO CREATE REMOVABLE SUPPORT MATERIALS

(71) Applicants: Akira Saitoh, Kanagawa (JP); Koji Takimoto, Kanagawa (JP); Andrew J. Boydston, Cross Plains, WI (US); Chang-Uk Lee, Seattle, WA (US); Mark A. Ganter, Edmonds, WA (US); Duane W. Storti, Seattle, WA (US)

(72) Inventors: Akira Saitoh, Kanagawa (JP); Koji Takimoto, Kanagawa (JP); Andrew J. Boydston, Cross Plains, WI (US); Chang-Uk Lee, Seattle, WA (US); Mark A. Ganter, Edmonds, WA (US); Duane W. Storti, Seattle, WA (US)

(73) Assignees: Ricoh Company, Ltd., Tokyo (JP); University of Washington, Seattle, WA (US)

( * ) Notice: Subject to any disclaimer, the term of this patent is extended or adjusted under 35 U.S.C. 154(b) by 441 days.

(21) Appl. No.: 16/355,606

(22) Filed: Mar. 15, 2019

(65) Prior Publication Data
US 2020/0290270 A1 Sep. 17, 2020

(51) Int. Cl.
| | | |
|---|---|---|
| B29C 64/00 | (2017.01) | |
| B29C 64/165 | (2017.01) | |
| B29C 64/30 | (2017.01) | |
| C08L 41/00 | (2006.01) | |
| C08L 69/00 | (2006.01) | |
| C08L 71/00 | (2006.01) | |
| B29K 71/00 | (2006.01) | |
| B29K 105/00 | (2006.01) | |
| B33Y 10/00 | (2015.01) | |
| B33Y 30/00 | (2015.01) | |
| B33Y 40/00 | (2020.01) | |
| B33Y 70/00 | (2020.01) | |
| B33Y 80/00 | (2015.01) | |

(52) U.S. Cl.
CPC ............ B29C 64/165 (2017.08); B29C 64/30 (2017.08); C08L 41/00 (2013.01); C08L 69/00 (2013.01); C08L 71/00 (2013.01); *B29K 2071/00* (2013.01); *B29K 2105/0085* (2013.01); *B29K 2105/251* (2013.01); *B33Y 10/00* (2014.12); *B33Y 30/00* (2014.12); *B33Y 40/00* (2014.12); *B33Y 70/00* (2014.12); *B33Y 80/00* (2014.12)

(58) Field of Classification Search
CPC .............................. B29C 64/165; B29C 64/30
See application file for complete search history.

(56) References Cited

U.S. PATENT DOCUMENTS

| | | | |
|---|---|---|---|
| 5,121,329 A | 6/1992 | Crump | |
| 5,888,642 A * | 3/1999 | Meteer | B29C 70/086 428/313.5 |
| 6,375,874 B1 | 4/2002 | Russell et al. | |
| 6,416,850 B1 | 7/2002 | Bredt et al. | |
| 2004/0005360 A1* | 1/2004 | Wang | B33Y 80/00 424/473 |
| 2004/0169699 A1* | 9/2004 | Hunter | B29C 64/40 347/54 |
| 2004/0251574 A1* | 12/2004 | Collins | B29C 64/165 264/113 |
| 2012/0207929 A1* | 8/2012 | Yoo | A61K 9/0056 427/258 |
| 2017/0297108 A1 | 10/2017 | Gibson et al. | |
| 2017/0297111 A1* | 10/2017 | Myerberg | B33Y 40/20 |
| 2018/0071820 A1* | 3/2018 | Natarajan | B33Y 10/00 |
| 2018/0154437 A1* | 6/2018 | Mark | B22F 3/1025 |
| 2018/0154438 A1* | 6/2018 | Mark | B22F 3/1146 |
| 2018/0162048 A1* | 6/2018 | Gibson | B29C 64/118 |
| 2018/0162060 A1* | 6/2018 | Mark | B29C 64/165 |
| 2018/0162061 A1* | 6/2018 | Mark | B29C 64/165 |
| 2018/0236731 A1* | 8/2018 | Natarajan | B33Y 40/00 |
| 2018/0291511 A1* | 10/2018 | Katogi | B33Y 10/00 |
| 2018/0305266 A1* | 10/2018 | Gibson | B22F 10/10 |
| 2018/0345576 A1* | 12/2018 | Constantinou | B29C 64/264 |
| 2019/0099942 A1* | 4/2019 | Thompson | B28B 11/243 |
| 2019/0270254 A1* | 9/2019 | Mark | B22F 3/1118 |
| 2020/0062877 A1* | 2/2020 | Knopf | C08F 220/56 |

FOREIGN PATENT DOCUMENTS

WO 2018017072 A1 1/2018

OTHER PUBLICATIONS

Lloyd, E.M., Lopez Hernandez, H., Feinberg, E.C., Yourdkhani, M., Zen, E.K., Mejia, E.B., Sottos, N.R., Moore, J.S. and White, S.R., 2018. Fully recyclable metastable polymers and composites. Chemistry of Materials, 31(2), pp. 398-406. (Year: 2018).*
Extended European Search Report for EP Application No. 20162628.0, mailed Aug. 3, 2020, 10 pgs.
Peterson et al., "Controleld Depolymerization: Stimuli-Responsive Self-Immolative Polymers," Macromolecules 2012, 45, pp. 7317-7328.

* cited by examiner

*Primary Examiner* — Nicholas R Krasnow
(74) *Attorney, Agent, or Firm* — Patent Law Works LLP (57) ABSTRACT

The present invention provides methods, processes, and systems for the manufacture of three-dimensional articles made of polymers using 3D printing. A layer of prepolymer is deposited on a build plate to form a powder bed. Then, solutions of first and/or second binding agents are printed on the powder bed in a predetermined pattern. After a predetermined period of time, sequential layers are printed to provide the three-dimensional article. The removable binding agent is then removed. The three-dimensional object can be cured to produce the three-dimensional article composed of the final polymers.

9 Claims, 3 Drawing Sheets

| entry | trigger class | structure and response to stimulus | stimulus | SI platform (ref.) |
|---|---|---|---|---|
| 1 | E |  → $H_2N-R$ | plasmin | oligomer (2) |
| 2 | E |  →  | antibody 38C2 | dendrimer (31, 32, 34) |
| 3 | E |  → $H_2N-R$ | penicillin G amidase | dendrimer (33-38, 41)<br>polymer (15, 19)<br>oligomer (39, 40) |
| 4 | E |  →  | bovine serum albumin,<br>antibody 38C2 | polymer (14, 19) |
| 5 | E |  → $H_2N-R$ | cathepsin B | dendrimer (29) |
| 6 | E |  → $HO-R$ | β-glucuronidase | dendrimer (30) |
| 7 | R |  →  | Zn/AcOH | dendrimer (3)<br>oligomer (16) |
| 8 | R |  → $^{\ominus}O-R$ | Pd, Pd/NaBH$_4$ | dendrimer (4, 6, 17, 43)<br>polymer (25)<br>oligomer (18) |
| 9 | R |  →  | dithiothreitol | polymer (21) |
| 10 | R |  →  | H$_2$O$_2$ | dendrimer (41, 44)<br>polymer (19)<br>oligomer (48) |
| 11 | R |  →  | H$_2$O$_2$ | dendrimer (45-47, 49) |
| 12 | N |  → $^{\ominus}O-R$ | fluoride | dendrimer (51)<br>polymer (25, 28) |
| 13 | N |  → $HO-R$ | H$_2$O | polymer (20) |
| 14 | A |  →  | H$^{\oplus}$ | dendrimer (5, 32, 36, 38, 52)<br>polymer (20, 53) |
| 15 | A |  →  | piperidine,<br>morpholine | polymer (15, 19) |
| 16 | A |  →  | piperidine | polymer (53) |
| 17 | P | <br>R" = Me, dodecyl | →  | UV radiation | dendrimer (5)<br>polymer (54)<br>oligomer (18) |
| 18 | P |  →  | NIR radiation | polymer (54) |

FIGURE 3

JETTABLE TEMPORARY BINDERS TO CREATE REMOVABLE SUPPORT MATERIALS

FIELD OF INVENTION

The present invention relates to methods and apparatus for creating three-dimensional articles by printing.

BACKGROUND

Three-dimensional (3D) printing refers to processes that create 3D objects based upon digital 3D object models and a materials dispenser. In 3D printing, a dispenser moves in at least 2-dimensions and dispenses material according to a determined print pattern. To build a 3D object, a platform that holds the object being printed is adjusted such that the dispenser is able to apply many layers of material, and printing many layers of material, one layer at a time, may print a 3D object.

A conventionally known 3D printing process is the UV ink-jet process. It is a three-stage process of applying a material, printing a UV-curable liquid, which is hardened using a UV source. These steps are repeated layer-by-layer. In conventional 3D printing, generally an inkjet type print head delivers a liquid or a colloidal binder material to layers of a powdered build material. The printing technique involves applying a layer of a powdered build material to a surface typically using a roller. After the build material is applied to the surface, the print head delivers the liquid binder to predetermined areas of the layer of material. The binder infiltrates the material and reacts with the powder, causing the layer to solidify in the printed areas by, for example, activating an adhesive in the powder. The binder also penetrates into the underlying layers, producing inter-layer bonding. After the first cross-sectional portion is formed, the previous steps are repeated, building successive cross-sectional portions until the final object is formed.

The oldest and the best-known laser-based 3D printing process is stereolithography (SLA). In this process, a liquid composition of a radiation-curable polymer is hardened layer-by-layer by using a laser. A similar process is Selective Laser Sintering (SLS) in which a thermoplastic or a sinterable metal is sintered selectively layer-by-layer by a laser to form the 3D object.

A fused deposition modeling (FDM) process for the production of three-dimensional objects using an extrusion-based, digital manufacturing system has also been used. There are also other known processes that are substantially analogous with slight differences, for example fused filament fabrication (FFF), melt extrusion manufacturing (MEM) or selective deposition modeling (SDM).

In the FDM method, two different polymer filaments are melted in a nozzle and are printed selectively. One of the materials involves a support material, which is needed only at locations above which an overhanging part of the 3D object is printed and requires support during the subsequent printing procedure. The support material can be removed subsequently, e.g. via dissolution in acids, bases or water. The other material (the build material) forms the actual 3D object. Here again, the print is generally achieved layer-by-layer.

SUMMARY

The present invention provides methods, processes, and systems for manufacture of three-dimensional articles composed of polymers using 3D printing.

In one aspect, disclosed are methods for manufacturing a three-dimensional article, the method comprising depositing a powder on a build plate to form a powder bed; printing, at selected locations on the powder bed, a first binding agent and/or a second binding agent; exposing the printed solution to a stimulus to form a polymer layer of the three-dimensional article; repeating the steps to manufacture remainder of the three-dimensional article; and removing the second binding agent. The first and second binding agent are each printed at least once and the first and second binding agents may be printed at different selected locations on the powder bed. In one aspect, the first binding agent is a permanent binding agent. In further aspects the second binding agent is a removable binding agent. In a particular aspect, the first binding agent is a permanent binding agent and the second binding agent is a removable binding age In another aspect, provided are three-dimensional articles made by the process of depositing a powder on a build plate to form a powder bed; printing, at selected locations on the powder bed, a first binding agent and/or a second binding agent; exposing the printed solution to a stimulus to form a polymer layer of the three-dimensional article; repeating the steps to manufacture remainder of the three-dimensional article; and removing the second binding agent. The first and second binding agent are each printed at least once and the first and second binding agents may be printed at different selected locations on the powder bed.

In another aspect, a system for printing a three-dimensional article is provided. The system comprising a depositing mechanism to depose a powder layer on a build plate; one or more printing mechanisms to print the first and second binding agents at selected locations; a stimulus mechanism to provide a stimulus to a printed binding agent; and a printing controller to repeat the printing mechanism to print the first and second binding agents on a powder layer exposed to a stimulus at a predetermined condition, These and other aspects of the present invention will become evident upon reference to the following detailed description.

DETAILED DESCRIPTION

I. Definitions

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise.

The term "alkyl" means the monovalent branched or unbranched saturated hydrocarbon radical, consisting of carbon and hydrogen atoms, having from one to twenty carbon atoms inclusive, unless otherwise indicated.

Examples of alkyl radicals include, but are not limited to, methyl, ethyl, propyl, isopropyl, butyl, isobutyl, sec-butyl, tert-butyl, pentyl, n-hexyl, octyl, dodecyl, and the like.

The term "alkylene" as used herein means the divalent linear or branched saturated hydrocarbon radical, consisting of carbon and hydrogen atoms, having from one to twenty carbon atoms inclusive, unless otherwise indicated. Examples of alkylene radicals include, but are not limited to, methylene, ethylene, trimethylene, propylene, tetramethylene, pentamethylene, ethylethylene, and the like.

The term "alkenylene" means the divalent linear or branched unsaturated hydrocarbon radical, containing at least one double bond and having from two to twenty carbon atoms inclusive, unless otherwise indicated. The alkenylene radical includes the cis or trans ((E) or (Z)) isomeric groups or mixtures thereof generated by the asymmetric carbons. Examples of alkenylene radicals include, but are not limited to ethenylene, 2-propenylene, 1-propenylene, 2-butenyl, 2-pentenylene, and the like.

The term "aryl" means the monovalent monocyclic aromatic hydrocarbon radical consisting of one or more fused rings in which at least one ring is aromatic in nature, which can optionally be substituted with hydroxy, cyano, lower alkyl, lower alkoxy, thioalkyl, halogen, haloalkyl, hydroxyalkyl, nitro, alkoxycarbonyl, amino, alkylamino, dialkylamino, aminocarbonyl, carbonylamino, aminosulfonyl, sulfonylamino, and/or trifluoromethyl, unless otherwise indicated. Examples of aryl radicals include, but are not limited to, phenyl, naphthyl, biphenyl, indanyl, anthraquinonyl, and the like.

As used herein, a "build plate" refers to a solid surface made from material such as glass, metal, ceramic, plastic, polymer, and the like.

The term "halogen" as used herein refers to fluoro, bromo, chloro, iodo, or combinations thereof.

The term "optional" or "optionally" means that the subsequently described event or circumstance may or may not occur, and that the description includes instances where the event or circumstance occurs and instances where it does not.

All publications, patents and patent applications cited herein, whether supra or infra, are hereby incorporated by reference in their entirety.

II. Overview

Disclosed are methods for manufacturing articles made of polymers using three-dimensional printing. The disclosed methods have the advantage of creating removable support features during the 3D printing process. Such support features avoid deformation or fracture of permanent portions of the printed article and are removable through the removal of a binding agent in response to a stimulus once the printing process is complete. The disclosed methods also have the advantage of being able to rapidly print three-dimensional articles that have better mechanical properties, better thermal properties, and the like. The disclosed methods are more flexible than other art methods in that they allow the three-dimensional article to be built with thin or fragile components or around another object, such as a conducting wire to make a circuit.

In one application, a layer of powder is deposited on a build plate as a powder bed, and then a solution of a first binding agent and/or a second binding agent is selectively printed to appropriate regions of the powder bed in accordance with the three-dimensional article being formed. A stimulus may be applied that polymerizes the first binding agent to form the final polymer. Subsequent sequential applications of powder, printing of binding agents and exposing to a stimulus complete the formation of the desired 3D article. The three-dimensional article is thus manufactured layer-by-layer. The first and second binding agent are each printed at least once and the first and second binding agents may be printed at different selected locations on the powder bed. Once a suitable number of layers have been deposited, the article is cured to provide the three-dimensional article made of the final polymer. The curing can be performed on the build plate or by removing the article from the build plate and then curing it. The second binding agent is then removed to provide the final product.

III. Powder

The three-dimensional form can be made from one or more materials. In certain embodiments, the three-dimensional form is created from a powder that is bound with a binder. Any type of powder can be used to form the three-dimensional form, and the powder can be selected such that the three-dimensional form has the desired properties. Examples of such powders are well known in the art and any such power can be used in the methods described herein. In aspects, the powder can be powdered prepolymer, powdered polymer, powdered ceramic, powdered metal, or powdered plastic. In additional aspects, the powder can be a combination of one or more powdered prepolymers, powdered polymers, powdered ceramics, powdered metals, and powdered plastics.

Examples of prepolymers and/or polymers that may be used include, but are not limited to, thermoplastic polymers, nylon, poly(amic) acids, polyimides, polyketones, such as polyetheretherketone (PEEK), polyaryletherketone (PAEK), polyetherketone (PEK), polyetherketoneketone (PEKK) polyetheretheretherketone (PEEEK), polyetheretherketoneketone (PEEKK), polyetherketoneetheretherketone (PEKEKK), or polyetherketoneketoneketone (PEKKK), reduced form of polyketones, polyethersulfones, and the like. Examples of powdered ceramic that may be used include, but are not limited to, alumina, zirconia, zircon zirconium silicate), and silicon carbide based ceramics. Examples of powdered metals that may be used include, but are not limited to, aluminum, titanium, and iron.

IV. Permanent Binding Agents

The three-dimensional form can be made from one or more materials. In certain embodiments, the three-dimensional form may comprise a binding agent which permanently binds particles of powder together. In aspects, the first binding agent is a permanent binding agent. As used herein, a permanent binding agent is any agent that is used to bind particles of powder so as to make up the final three-dimensional form. A permanent binding agent is not removed from the printed form after completion. Any type of permanent biding agent can be used, along with the powder, to form the three-dimensional form. The permanent binding agent can be selected, along with the powder, such that the three-dimensional form has the desired properties. Examples of such permanent binding agents are well known in the art and any such permanent binding agent can be used in the methods described herein. By way of nonlimiting examples, the permanent binding agent can be colloids, polyimides, polyketones, reduced form of polyketones, polyethersulfones, and the like. In aspects, the binding agent may be an activating agent that induces polymerization of prepolymer in the powder.

In aspects the permanent binding agent may be a prepolymer. After printing, the prepolymer may be exposed to a stimulus in order to polymerize the prepolymer. Examples of such prepolymers are well known in the art and any such prepolymer can be used in the methods described herein. Examples of prepolymers include, but are not limited to, poly(amic) acids, mixtures of at least one aromatic dihydroxy compound and at least one dihalobenzoid compound or at least one halophenol compound, lactic acid, silicone resin prepolymers, combinations of copolymers, block copolymers, and isocyantes. Examples of stimuli that induce curing or polymerization of the permanent biding agent include, but are not limited to, heat, light, enzymes, electromagnetic radiation, oxidation, reduction, acid catalysis, base catalysis, transition metal catalysis, and combinations of any of thereof.

In aspects, the permanent binding agent may be may be a liquid or may be dissolved in a solvent. The permanent binding agent, alone, suspended in a carrier, or in solution, should be of a viscosity which allows deposition by inkjet.

V. Removable Binding Agents

The three-dimensional form can be made from one or more materials. In certain embodiments, the three-dimensional form can comprise a binding agent which removably binds particles of powder together. In aspects, the second binding agent is a removable binding agent. As used herein, a removable binding agent is any agent that is used to bind particles of powder in the process of printing the three-dimensional form. A removable binding agent is removed from the printed form after completion. Any type of removable biding agent can be used, along with the powder, to form support structures that aid in the ability to reproducibly create the three-dimensional form. The removable binding agent can be selected, along with the powder, such that removable sections of the printed material have the desired properties.

After printing is complete, the removable binding agent may be exposed to a stimulus in order to remove or allow the removal of the removable binding agent from the three-dimensional form. Examples of stimuli that induce removal of the removable binding agent include, but are not limited to, heat, light, solvent, enzymes, electromagnetic radiation, oxidation, reduction, acid catalysis, base catalysis, transition metal catalysis, mechanical force, and combinations of any of thereof. In aspects, stimuli that remove or allow the removal of the removable binding agent do not degrade, alter the shape of, or remove the powder or the permanent binding agent.

In aspects, the removable binding agent may be a wax, grease, polymer adhesive, block copolymer, copolymer, polycarbonate, poly(vinlysulfone), polycarbomate, polyphthaldehyde, or a self-immolative polymer. Included are solutions and combinations of removable binding agents.

In aspects the removable binding agent may be a prepolymer. After printing, the prepolymer may be exposed to a stimulus in order to polymerize the prepolymer. Examples of stimuli that induce curing or polymerization of the removable biding agent include, but are not limited to, heat, light, enzymes, electromagnetic radiation, oxidation, reduction, acid catalysis, base catalysis, transition metal catalysis, and combinations of any of thereof.

In aspects, the removable binding agent may be may be a liquid or may be dissolved in a solvent. The removable binding agent, alone, suspended in a carrier, or in solution, should be of a viscosity which allows deposition by inkjet.

In aspects where heat is used to remove the removable binding agent, the temperature at which the removable binding agent undergoes a temperature-controlled phase change (e.g. melting temperature) should be above the temperature of powder during printing. In addition, the temperature at which the removable binding agent undergoes a temperature-controlled phase change (e.g. melting temperature) should be above the melting, sintering, and/or fusion temperature of the powder or the permanent binding agent. In aspects where heat is used, the heat softens or melts the removable binding agent allowing it flow from or be easily removed from the three-dimensional form mechanically.

VI. Self Immolative Polymers

Self-immolative polymers (SIPs) are unique macromolecules that are able to react to multiple types of environmental influences by giving amplified response outputs. When triggering moieties installed at SIP chain ends are activated by their corresponding stimuli, a spontaneous head to-tail depolymerization ensues, often involving multitopic release of small molecules. SIP designs have evolved a high degree of modularity in each of their functional components, enabling a broad range of utility and applications-driven tuning.

Synthesis of SIPS

SIPs from Condensation Polymerizations. Prior to the development of a true polymerization to achieve self-immolative polymers, discrete oligomers comprising linearly arranged self-immolative units were prepared by stepwise syntheses.[2,4,16] Oligomeric polyurethanes have been prepared by activation of a benzyl alcohol chain end via installation of a nitrophenyl carbonate and subsequent coupling with aminobenzyl alcohols to extend the chain by one repeat unit. This method is useful for synthesizing well-defined oligomers with three or fewer repeat units.

Similarly, oligomers containing benzyl phenyl ether linkages have been prepared by Mitsunobu coupling or $S_N2$ reactions of phenoxides and benzyl halides that provide access to self-immolative structures that do not require decarboxylation during depolymerization.

As a more direct route to SIPs, one-pot Sn(IV)-catalyzed polymerization of "blocked isocyanates" yields polyurethanes with degrees of polymerization (DPs) reaching ca. 20 within 15 min at 110° C. This polymerization can utilize monomers with or without functionalized side chains. After polymerization, the esters on the side chains of can be converted to carboxylic acids to increase the water solubility of the polymer. Trigger installation can be achieved by adding a nucleophilic alcohol or amine to the reaction mixture after polymerization had ensued. The end-capping agent reacts selectively with the phenyl carbamate chain end to cease polymerization and install functional groups bearing reactivities specific to triggering depolymerization at a later time.

Complementary to benzyl alcohol-based SIP main chains, condensation polymerizations of carbamate- and thiocarbamate-based monomers has been achieved for the production of two different classes of SIPs. For the synthesis of each, AB-type monomers can be utilized featuring an electrophilic p-nitrophenyl carbonate end group and a Boc-protected amine at opposite termini. To avoid coupling of the end groups during and after deprotection, the amine is maintained as a protonated ammonium salt. Then, upon addition of DMAP and Et3N, polymers are obtained with Mn values ranging from 1.8 to 17 kDa. Triggering moieties are incorporated at the polymer chain ends by conducting the polymerizations in the presence of a small amount of protected monomer. In this way, the same protecting group used to prepare the monomers also functions as the triggering moiety, although other triggers can be incorporated.

SIPs from Addition Polymerizations. Poly(phthalaldehyde) (PPA) is a SIP that can be prepared via anionic and cationic addition polymerizations of 1,2-benzenedicarboxaldehyde. The polymerization requires low temperatures, as the ceiling temperature of the polymer is −40° C. PPA produced via cationic polymerization was found to be thermally stable up to 150° C. in the solid state, whereas the product of anionic polymerization reverts almost instantaneously after isolation of the polymer if the end groups are not capped. Polymerizations yield polymers with molecular weights ranging from 20 to 30 kDa with PDIs of 1.1-1.3. The addition of a catalyst can reduce the reaction time and yield polymers with molecular weights of 70 kDa and PDIs of 1.6. While PPA has traditionally been depolymerized by acid-catalyzed hydrolysis initiated at random sites within the polymer main chain, end groups with functionalities that allow for selective triggering of head-to-tail depolymerization may be used.

Stimuli-Responsive Triggers

Figure 2:
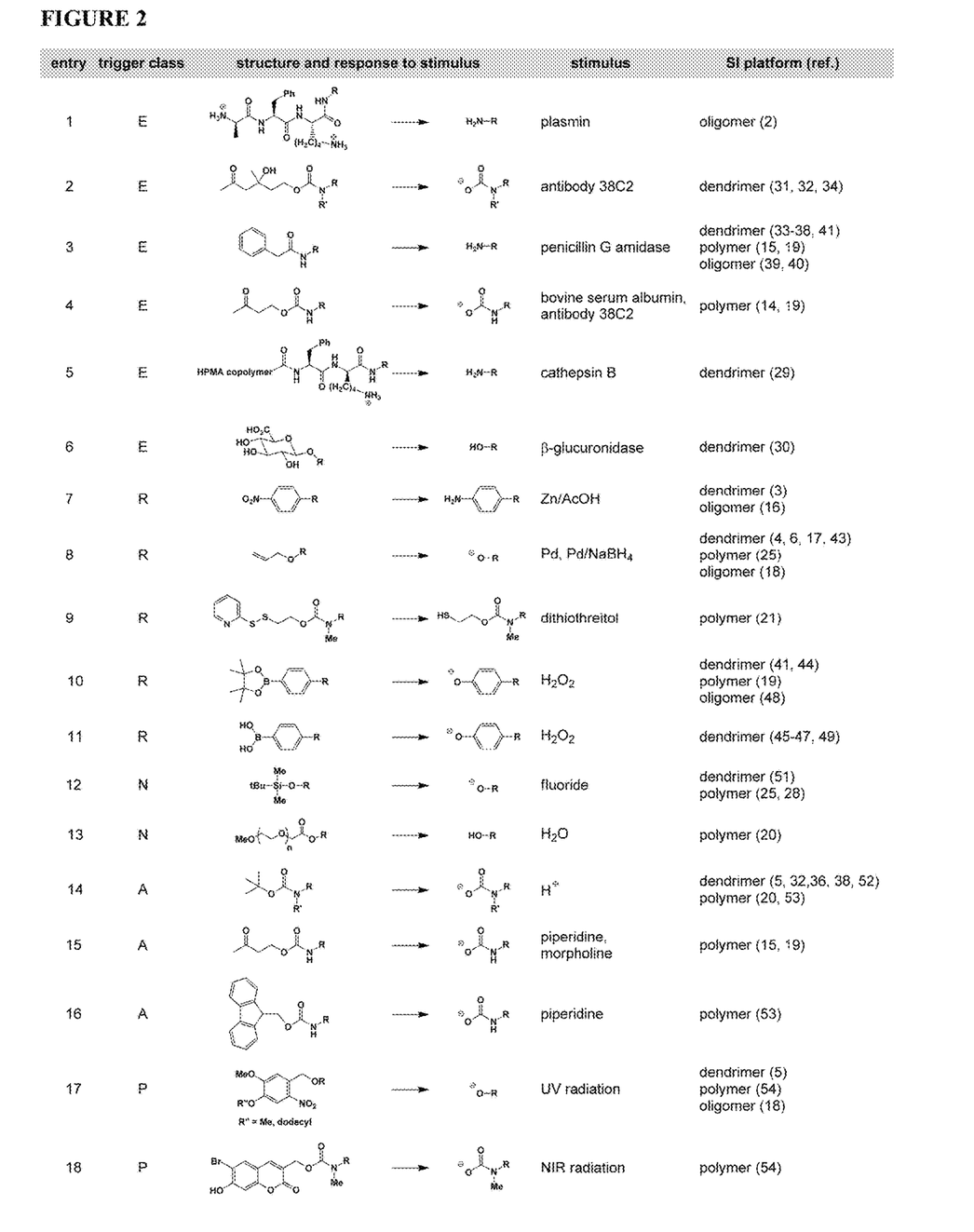
FIG. 2 provides a set of nonlimiting examples of self-immolating polymers grouped according to trigger class. Therein, E=enzyme, R=redox, N=nucleophile, A=acid/base, and P=photo. R=self-immolative segment, R'=H or Me.

Designing SIP triggers to be selectively responsive to specific stimuli enables the utilization of SIPs as a reversable binder. Multiple trigger designs have been reported, with representative examples depicted in FIG. 2. Although not all of the triggers have been used in linear polymeric systems, the modular nature of the triggering component facilitates incorporation of triggers for oligomeric or dendritic structures into linear SIPs. The primary reactivity observed for essentially all known triggering moieties is the unmasking of an electron-rich functional group in response to a specific stimulus that is compatible with the SIP main chain and output units. In many cases, cleavage of the triggering group liberates a carbamate or carbonate which undergoes subsequent decarboxylation to reveal an amine or hydroxyl group, respectively (FIG. 2, entries 2, 4, 14-16, and 18). Alternatively, some systems achieve direct conversion of the trigger into an electron-donating moiety without an intermediate decarboxylation step (FIG. 6, entries 1, 3, and 5-13). Distinct trigger/stimulus combinations can be conveniently grouped according to the type of stimulus required for their activation. These classes consist of enzyme, redox, nucleophile, acid/base, and photomediated cleavage.

Enzyme-Mediated Cleavage. Enzymatic substrates (FIG. 2, entries 1-6) are triggers capable of multiple elimination events. In linear SIPs, enzymatic triggering event may be rate-determining in the overall process of SIP depolymerization. The wealth of kinetic information on enzyme mediated cleavage makes enzyme-triggered SIPs attractive targets for applications in which fine-tuning of initiation kinetics or highly specific triggering events are required.

Redox-Mediated Cleavage. The ease of installation and activation of redox-mediated triggers makes them attractive for self-immolative scaffolds. Spanning small to macromolecular systems, examples of redox triggers include transition metal-mediated reductions (FIG. 2, entries 7 and 8), reduction of disulfide linkages (FIG. 2, entry 9), and oxidation of boronates with peroxides (FIG. 2, entries 10 and 11). For example, the aryl allyl ether utilized in dendritic and oligomeric systems (FIG. 2, entry 8) may be used in linear polymers by installing an allyl carbonate triggering group at the head of a phthalaldehyde-based SIP. Upon exposure to a Pd0 source, the allyl fragment is removed and subsequent decarboxylation reveals a hemiacetal, thereby commencing the depolymerization process. Disulfides have also been developed as reductive triggers for SIPs having DPs of ~35 (Mw ~3.0 kDa) and offer the potential for biologically relevant redox triggering (FIG. 2, entry 9). Disulfide end groups can be incorporated and activated in response to dithiothreitol. The use of phenylboronates as triggers for SIPs introduces a platform for activation under oxidative conditions (FIG. 2, entry 10). This class of trigger has been used in dendritic systems (FIG. 2, entry 11) to be responsive to hydrogen peroxide generated from either triacetone triperoxide44 or enzymatic action. In each of these systems, conversion of the boronate moiety into an electron-releasing phenol leads to initiation of the selfimmolative cascade.

Nucleophile-Mediated Cleavage. Nucleophilic attack can also serve to liberate electron-releasing functionalities (FIG. 2, entries 12 and 13). This is an attractive option in cases in which the components of the SIP are not stable to aqueous conditions, as the use of tetrabutylammonium fluoride for silyl ether cleavage requires no adventitious water. Water itself can also serve as a nucleophile to hydrolyze labile esters.

Acid/Base-Mediated Cleavage. Traditional acid- and base-sensitive protecting groups also provide a facile means of triggering SIPs (FIG. 2, entries 14-16). In particular, the fidelity and familiarity of Boc and Fmoc protecting groups have essentially established these functionalities as standards for comparison when developing new triggering moieties. Their reactivities are ideally suited to SIP applications, as each strongly diminishes the electron-donating ability of the amine. The reagents required to install and activate these triggers are inexpensive and readily available, and pH modulation is a simple process for on-demand triggering of SIPs.

Photomediated Cleavage. Photomediated cleavage of nitrobenzyl carbamates and bromocoumarins (FIG. 2, entries 17 and 18) requires only the appropriate wavelength and intensity of light to initiate the depolymerization process; in other words, no additional chemical reagents are required to activate the SIP. Linear polymers incorporating a light sensitive o-nitrobenzyl carbamate (FIG. 2, entry 17) or bromocoumarin trigger (FIG. 2, entry 18) have been developed. Upon exposure to the appropriate wavelength of light, the photosensitive moiety was removed, triggering depolymerization and complete degradation of high Mw (>35 kDa) polymer.

Depolymerization of Self-Immolative Polymers

Upon removal of the triggering group from the SIP chain end, three distinct depolymerization mechanisms have been demonstrated: (1) 1,6- and 1,4-eliminations to form quinone methides, (2) cyclizations to form imidazolidinones, oxazolidinones, or 1,3-oxathiolan-2-ones, and (3) breakdown of hemiacetals to dialdehyde monomers (FIG. 7). Each mechanism exhibits distinct breakdown kinetics, and the times for each to reach complete depolymerization are qualitatively ordered as hemiacetal eliminations<1,6-eliminations<1,4-eliminations<cyclization-eliminations. As will be described below, some depolymerization pathways produce highly reactive monomeric intermediates whereas others result in more stable small molecule products.

Figure 3:
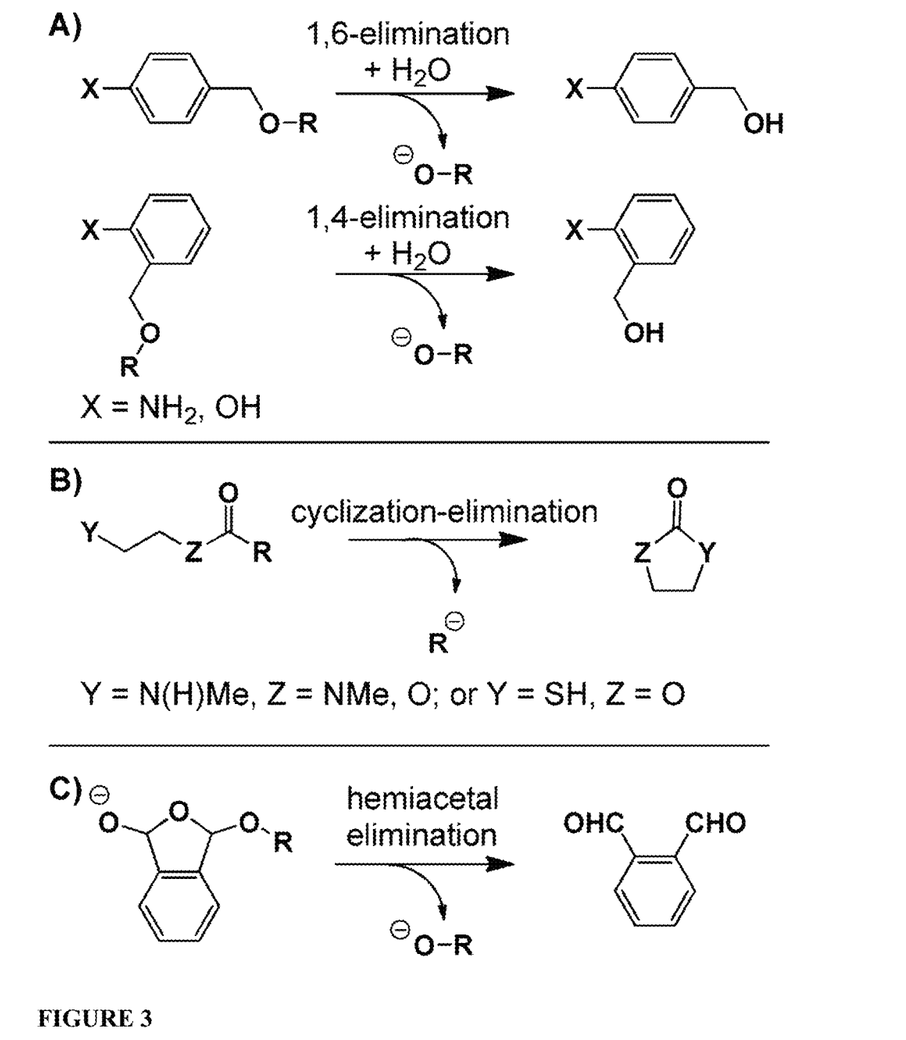
FIG. 3 illustrates self-immolative responses of different types of monomer units: (A) 1,6- and 1,4-elimination to form quinone methides, (B) cyclization-elimination, and (C) hemiacetal elimination.

1,6- and 1,4-Eliminations. Repeat units containing pbenzylic or o-vinylogous linkages eliminate in a 1,6-fashion, whereas 1,4-eliminations are observed from repeat units bearing o-benzylic connectivities (FIG. 3A). In each case, a reactive quinone methide intermediate is formed. The released species can either be a small molecule output or an activated chain end poised to continue the depolymerization. Routing the elimination events through both the o- and p-positions gives rise to multifunctional SIPs designed for main-chain disassembly and release of side-chain output molecules. In most cases, complete depolymerization is achieved in 5-10 h in systems utilizing exclusively elimination via quinone methide formation. The electronic nature of the arene core significantly affects elimination kinetics of 1,4-elimination. Replacement of a methyl group with an ethyl ester in the position para to the electron-donating phenoxide increases the rate of elimination 30-fold in both first- and second-generation self-immolative dendrimers. Solvent has also been shown to influence elimination rates. Both 1,6- and 1,4-eliminations occur more rapidly in aqueous media than in organic solvents. In aqueous conditions, the solution is generally maintained at a slightly basic pH to facilitate elimination to the quinone methide, and accordingly depolymerization in organic solvents is aided by exogenous bases. AcOH also accelerates depolymerization when utilizing aprotic solvents.

When the immediate product of self-immolation is a highly reactive quinone methide, these intermediates are rapidly trapped by adventitious nucleophiles. In most cases the nucleophile is a solvent molecule such as water; however, in the presence of more potent nucleophiles other depolymerization products can arise.

Cyclization-Eliminations. An alternative method of self-immolative depolymerization is based upon an intramolecular 5-exo-trig cyclization with concurrent release of an electron-rich leaving group (FIG. 3B). This occurs in systems forming ureas, carbamates, and thiocarbonates. The SIP polyurethanes are based upon this type of elimination event. Compared with elimination through an arene monomer, cyclization-elimination is much slower and appears to be the rate-limiting step in all reported self-immolative systems in which it is incorporated. Incorporation of the cyclizing units can be used to tune the degradation kinetics.

Hemiacetal Eliminations. The head-to-tail selfimmolative breakdown of PPA (FIG. 3C) occurs much more rapidly than depolymerization observed from other types of SIPs. Upon trigger cleavage at the head of the polymer, a hemiacetal is revealed. Subsequent reversion to the free aldehyde eliminates the next hemiacetal, thus propagating the self-immolative sequence. In solution, this process has been observed to take place in a matter of seconds, and depolymerization in solid materials required only 15 min for complete reversion to phthalaldehyde monomer units.

VII. Printing

A powder, a first binding agent, and a second binding agent can be used in a process to create three-dimensional articles using a three-dimensional printing system. A three-dimensional printing system can have a computer, a three-dimensional printer, means for dispensing the powder, and one or more means for dispensing the first and second binding agents. In aspects, one means may be used for dispensing both the first and the second binding agents. In other aspects, each of the first and second binding agents may have a separate means of being dispensed. The three-dimensional printing system can optionally contain a post-printing processing system. The computer can be a personal computer, such as a desktop computer, a portable computer, or a tablet. The computer can be a stand-alone computer or a part of a Local Area Network (LAN) or a Wide Area Network (WAN). Thus, the computer can include a software application, such as a Computer Aided Design (CAD)/Computer Aided Manufacturing (CAM) program or a custom software application. The CAD/CAM program can manipulate the digital representations of three-dimensional articles stored in a data storage area. When a user desires to fabricate a three-dimensional article, the user exports the stored representation to a software program, and then instructs the program to print. The program prints each layer by sending instructions to control electronics in the printer, which operates the three-dimensional printer. Alternatively, the digital representation of the article can be directly read from a computer-readable medium (e.g., magnetic or optical disk) by printer hardware.

Typically, a first layer of the powder can be deposited onto a build plate. The deposited powder is preferably heated to a temperature that is less than about 200° C., and can be in the range of about 30° C. to 170° C., or in the range of about 50° C. to about 150° C. The temperature is selected such that it is below that at which melting, sintering, and/or fusion of the powder occurs. Where the powder is a prepolymer, the temperature may be selected so that it aids in the polymerization of the of the prepolymer when the first binding agent is added. Thus, the deposited powder can be heated to a build temperature of about 40° C., 50° C., 60° C., 70° C., 80° C., 100° C., 110° C., 120° C., 130° C., 140° C., 150° C., 160° C., 170° C., 180° C., 190° C., 200° C., 210° C., 220° C., 230° C., 240° C., 250° C., and the like. The deposited powder can be heated to the desired temperature using any of the known contact or non-contact methods, such as for example, using a heater including, but not limited to, a microwave heater, an infrared heater, an induction heater, a micathermic heater, a solar heater, a heat exchanger, an arc heater, a dielectric heater, a gas heater, a plasma heater, a lamp heater, an infrared heater or any combination thereof, by using a heated plate or a heated roller, or by locally heating the prepolymer solid or powder using a laser or a laser diode, such as, for example, a scanning carbon dioxide laser.

The first layer of the powder can be deposited onto the build plate using any of the known methods, such as, using a roller, using a scraper, using mechanical means, and the like. Thus, for example, a measured quantity of the powder can be distributed over the build plate to a desired thickness using a roller. In another aspect, the layer of the powder can have a thickness of about 0.1 nm to less than 500 nm, of about 5 nm to about 250 nm, of about 0.2 nm to about 100 nm, of about 0.3 nm to about 50 nm, of about 0.3 nm to about 25 nm, of about 0.3 nm to about 20 nm, of about 0.3 nm to about 15 nm, of about 0.3 nm to about 10 nm, of about 0.3 nm to about 5 nm, and the like. In yet another aspect, the layer of the powder can have a thickness of about 10 microns to less than about 500 microns, of about 25 microns to about 250 microns, or of about 50 microns to about 100 microns.

Figure 1:
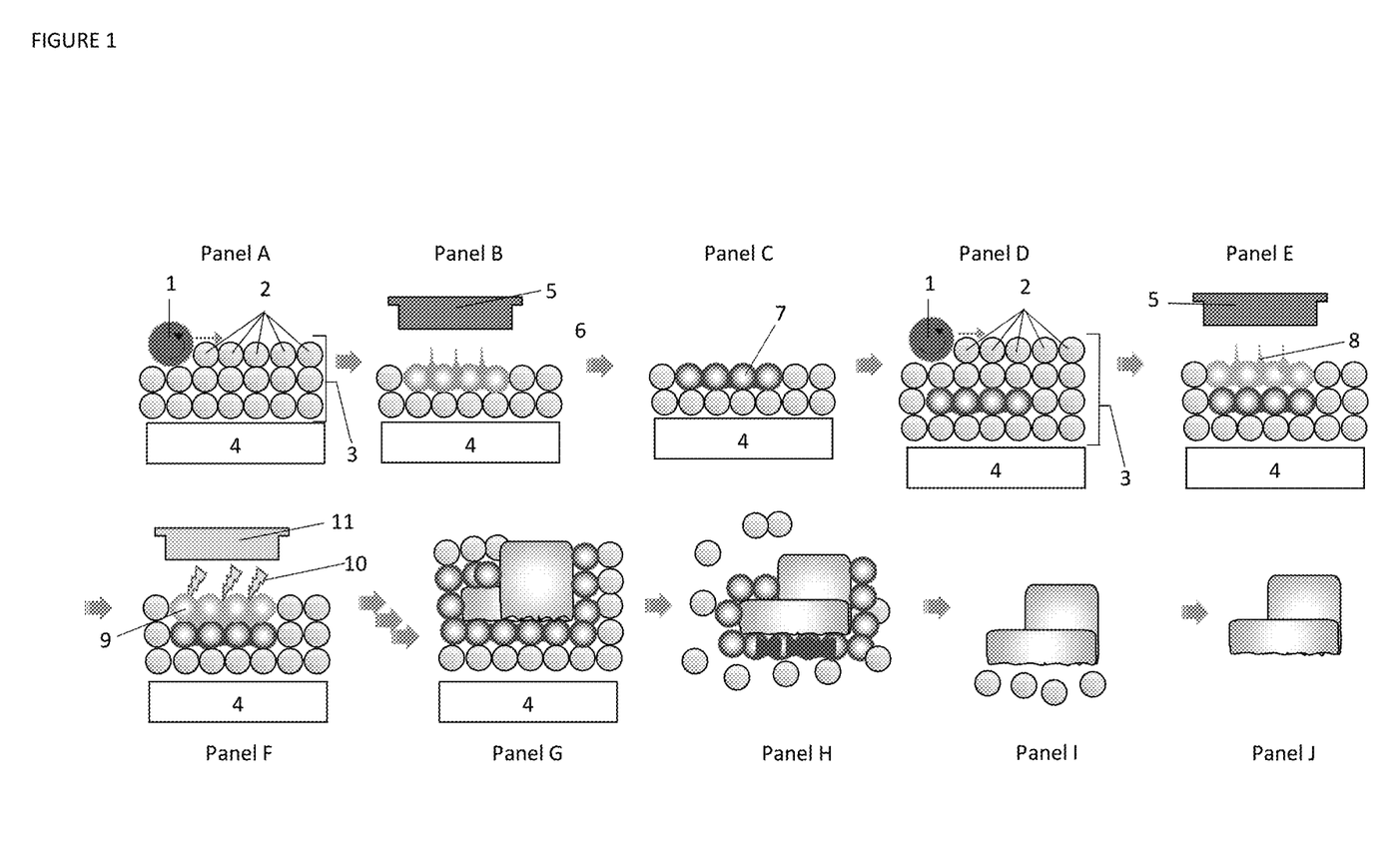
FIG. 1 illustrates a method of printing a three-dimensional article layer by layer as disclosed herein.

The method of printing a three-dimensional article layer by layer is illustrated in FIG. 1. In Panel A of FIG. 1, the roller 1, deposits powder 2 from one or more powder bed reservoirs to the powder bed 3. The build plate 4 can move in vertical direction as needed. In Panel B of FIG. 1, the head 5 prints a second binding agent 6 on the powder bed 3. The second binding agent can be printed onto the powder bed on the build plate by any printing mechanism. For example, printing may comprise inkjet printing, screen printing, gravure printing, offset printing, flexography (flexographic printing), spray-coating, slit coating, extrusion coating, meniscus coating, microspotting, pen-coating, stenciling, stamping, syringe dispensing and/or pump dispensing the second binding agent in a predefined pattern.

In Panel C of FIG. 1, after the printing of the second binding agent, a support structure 7 is formed from the powder and the second binding agent. If required or desired, the second binding agent may be exposed to a stimulus to bind the powder on which it was deposited. In aspects, the stimulus may be heat or light.

In Panel D of FIG. 1, the roller 1, deposits a new powder layer of powder 2 from one or more powder bed reservoirs to the powder bed 3. In Panel E of FIG. 1, the head 5 prints a first binding agent 8 on the powder bed 3. The first binding agent can be printed onto the powder bed on the build plate by any printing mechanism. For example, printing may comprise inkjet printing, screen printing, gravure printing, offset printing, flexography (flexographic printing), spray-coating, slit coating, extrusion coating, meniscus coating, microspotting, pen-coating, stenciling, stamping, syringe dispensing and/or pump dispensing the first binding agent in a predefined pattern.

In Panel F of FIG. 1, after the printing of the first binding agent, a permanent structure 9 is formed from the powder and the first binding agent. If required or desired, the first binding agent may be exposed to a stimulus 10 from a stimulus source 11 to bind the powder on which it was deposited. In aspects, the stimulus may be heat, light, enzymes, electromagnetic radiation, oxidation, reduction, acid catalysis, base catalysis, transition metal catalysis, and combinations of any of thereof.

The process of Panels A-F of FIG. 1 may be repeated as desired to build, layer upon layer, a permanent structure and support structures as depicted in Panel G. Where permanent structures and support structures are present in the same layer, the process of Panels B and C as well as Panels E and F may be performed sequentially or concurrently.

After the last layer has been printed, any unbound powder may be removed as is depicted in FIG. 1, Panel H. As shown in FIG. 1, Panel I, the second binding agent is then removed to free any power bound thereby. Removal of the second binding agent may be utilizing a stimulus such as, but not limited to heat, light, solvent, enzymes, electromagnetic radiation, oxidation, reduction, acid catalysis, base catalysis, transition metal catalysis, mechanical force, and combinations of any of thereof. In aspects, stimuli that remove or allow the removal of the removable binding agent do not degrade, alter the shape of, or remove the powder or the first binding agent. In further aspects, removal of the second binding agent may be performed by immersion of the object in a solvent, a dispersion, or solution that is the stimulus or contains the stimulus After removal of the second binding agent and any powder bound thereby, the final product, as depicted in FIG. 1, Panel J is obtained. Thus, a three-dimensional article can be built layer by layer by depositing a series of powder layers on a build plate to form a powder bed, and printing a first and second agents onto the powder bed.

V. Curing

The three-dimensional article obtained using the methods and processes described above can be cured to obtain the final three-dimensional article. The curing of the article can be done while it is attached to the build plate, or the curing of the article can be done by separating it from the build plate first and then curing it. In the curing process, where the polymer or the first binding agent is a prepolymer, any unreacted prepolymer is converted to the final polymer. Thus, for example, if the prepolymer is poly(amic acid), the unreacted poly(amic acid) is converted to the polyimide polymer via imidization during the curing process.

In one aspect, during the curing process, poly(amic acid) can be converted to a polyimide polymer by dehydration wherein water is eliminated. Imidization to produce the polyimide, i.e. ring closure in the poly(amic acid), can be effected through thermal treatment, chemical dehydration or both, followed by the elimination of a condensate. The polyimide polymer can be produced by a polymerization/imidization reaction according to a known method such as a thermal imidization by heat treatment accompanied by solvent removal and a chemical imidization, for example, by treatment with acetic anhydride accompanied by solvent removal.

In one aspect, chemical imidization can be used to convert poly(amic acid) to the polyimide. Chemical imidization can be carried out using known agents, such as acetic anhydride; orthoesters, such as, triethyl orthoformate; coupling reagents, such as, carbodiimides, such as dicyclohexylcarbodiimide (DCC) and diisopropylcarbodiimide (DIC), boronic acid, boronic esters, and the like.

In yet another aspect, the curing of compounds such as polyimide and compositions or articles comprising polyimides can be accomplished by curing at elevated temperatures. The curing can be by isothermal heating at a temperature greater than about 190° C., preferably greater than about 250° C., more preferably greater than about 290° C. Thus, the thermal imidization can be carried out at about 280° C., about 290° C., about 300° C., about 310° C., about 320° C., about 350° C., about 375° C., and the like. The curing temperature is selected such that poly(amic acid) is converted to a polyimide and the temperature is below the glass transition temperature or the melting point of the polyimide.

Alternatively, the curing at elevated temperatures can be performed in an isothermal staging process. As an example, such an isothermal staging process can start by heating the material to be cured to 180° C. to 220° C., such as to about 200° C., for some time, typically 1 to 2 hours. However, also less time, such as less than 1 hour, or less than 30 minutes, can be used. Further, also longer times, such as up to 10 hours may be used. Subsequently, the temperature can be increased in steps. Each step may correspond to an increase of the temperature of 10° C. to 50° C. Further, each step may have duration of 30 minutes to 10 hours, such as 1 to 2 hours. The last step may be curing at a temperature of 250 to 400° C., such as at about 300° C. In an isothermal staging process the duration of each isothermal step may decrease as the temperature increases. A further example of an isothermal staging process, is a process starting at 150° C. in which the temperature is increased by 25° C. every hour until 300° C. is reached.

Curing the final product at elevated temperatures can be performed with continuously increasing temperature. Preferably, the heating rate is slow initially but gradually increased as the temperature increases. Thus, for example, the heating process can start at 150° C. and the temperature is increased continuously until 300° C. or above is reached.

The time of heating for thermal imidization can be about 0.1 h to about 48 h, such as 0.5 h to 15 hours, or 0.5 h to 5 h.

The polyimide polymer thus produced has a tensile strength at break of 150 MPa or higher, more preferably 200 MPa or higher, particularly preferably 250 MPa or higher. The tensile strength can be measured using known methods, such by using the Instron Load Frame instruments.

The polyimide polymer thus produced has a tensile modulus of 1.5 GPa or higher, more preferably 2.0 GPa or higher, particularly preferably 2.5 GPa or higher.

The three-dimensional articles prepared using the methods, processes, and systems of the invention are useful in circuit applications, medical applications, transportation applications, and the like. For example the three-dimensional articles can be a printed circuit, an insulator, a medical construct such as an orthotic device, a dental implant, prosthetic sockets, and the like, seal rings, washers, and the like.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

We claim:

1. A method for manufacturing a three-dimensional article, the method comprising:
    a. depositing a powder on a build layer to form a powder bed on top of the build layer;
    b. printing, on the powder bed,
        a first solution of a first binding agent at a first location on the powder bed which penetrates the powder bed to the build layer; and/or
        a second solution of a second binding agent at a second location on the powder bed;
    c. exposing any first binding agent and second binding agent printed in step (b) to one or more stimuli to bind together the powder on which a binding agent was printed so as to form a new build layer that is bound to the original build layer;
    d. repeating steps (a)-(c) to manufacture the remainder of an intermediate three-dimensional article;
        wherein the first binding agent and the second binding agent are each printed in the same layer at least once and
        wherein the first location and the second location are not the same;
    e. removing the intermediate three-dimensional article from a build plate and removing unbound powder from the intermediate three-dimensional article; and
    f. removing second binding agent from the intermediate three-dimensional article so as produce the manufactured three-dimensional article, wherein the manufactured three-dimensional article comprises the first binding agent;
    wherein the second binding agent is a self-immolative polymer.

2. The method according to claim 1, wherein particles bound by the second binding agent provide physical support to selected locations bound by the first binding agent.

3. The method according to claim 1, wherein the first and second binding agents are applied to the powder bed simultaneously at the first and second locations.

4. The method according to claim 1, wherein the one or more stimuli comprises heat, light, oxidation, acid catalysis, base catalysis, transition metal catalysis, or combination thereof.

5. The method according to claim 1, wherein removing second binding agent releases powder previously bound by the second binding agent.

6. The method according to claim 1, wherein the removing second binding agent comprises exposing the second agent to a removal stimulus.

7. The method according to claim 5, wherein the removal stimulus is selected from the group consisting of light, heat, acid, base, mechanical force, solvent, and enzymatic digestion.

8. The method according to claim 1, wherein the powder is selected from the group consisting of prepolymers, polymers, ceramics, metals, and plastics.

9. The method according to claim 1, wherein the first binding agent is selected from the group consisting of prepolymers, polymers, copolymers, block copolymers, and plastics.

* * * * *